March 19, 1963 G. L. N. MEYER ETAL 3,081,859
BOTTLE LOADING APPARATUS
Filed May 18, 1961 5 Sheets-Sheet 5
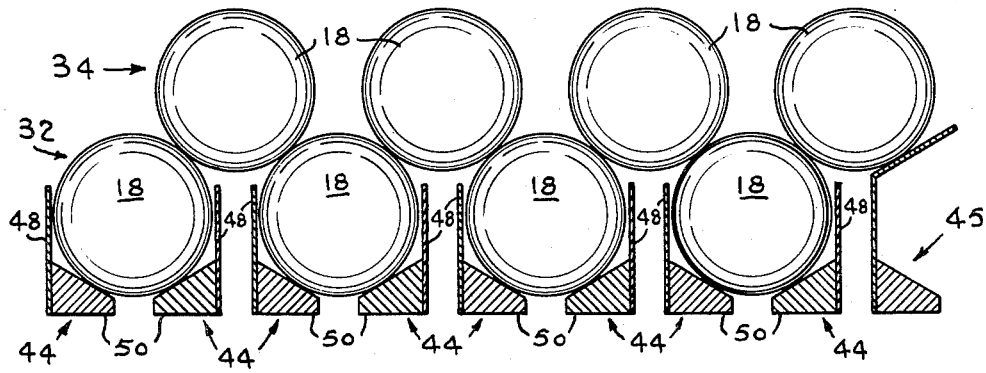
FIG. 6
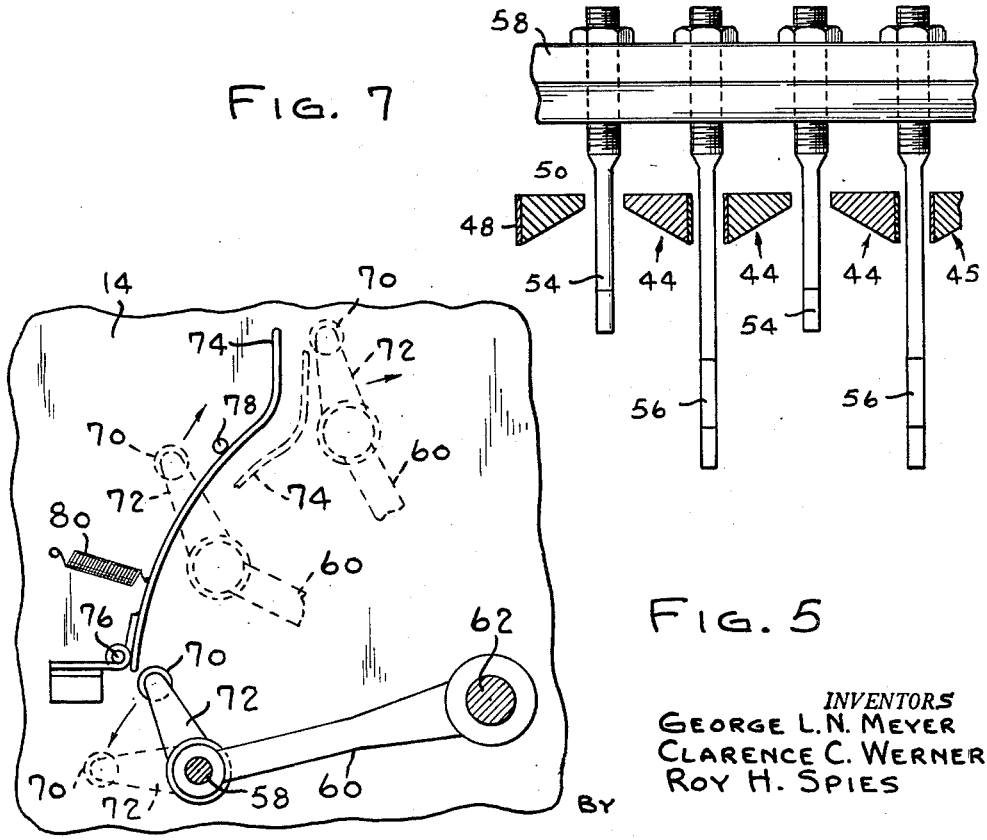
FIG. 7
FIG. 5
INVENTORS
GEORGE L. N. MEYER
CLARENCE C. WERNER
ROY H. SPIES
BY
ATTORNEY

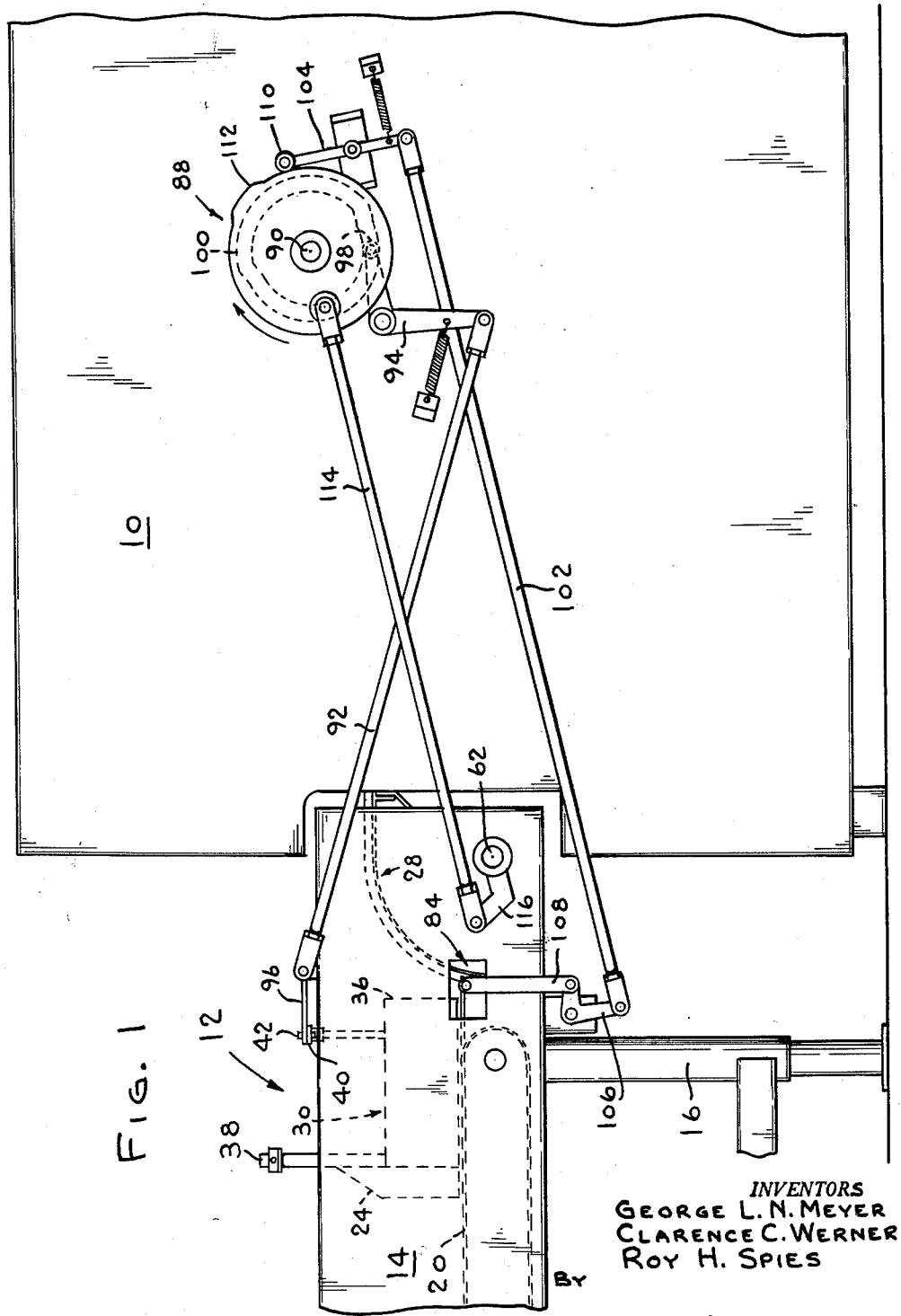

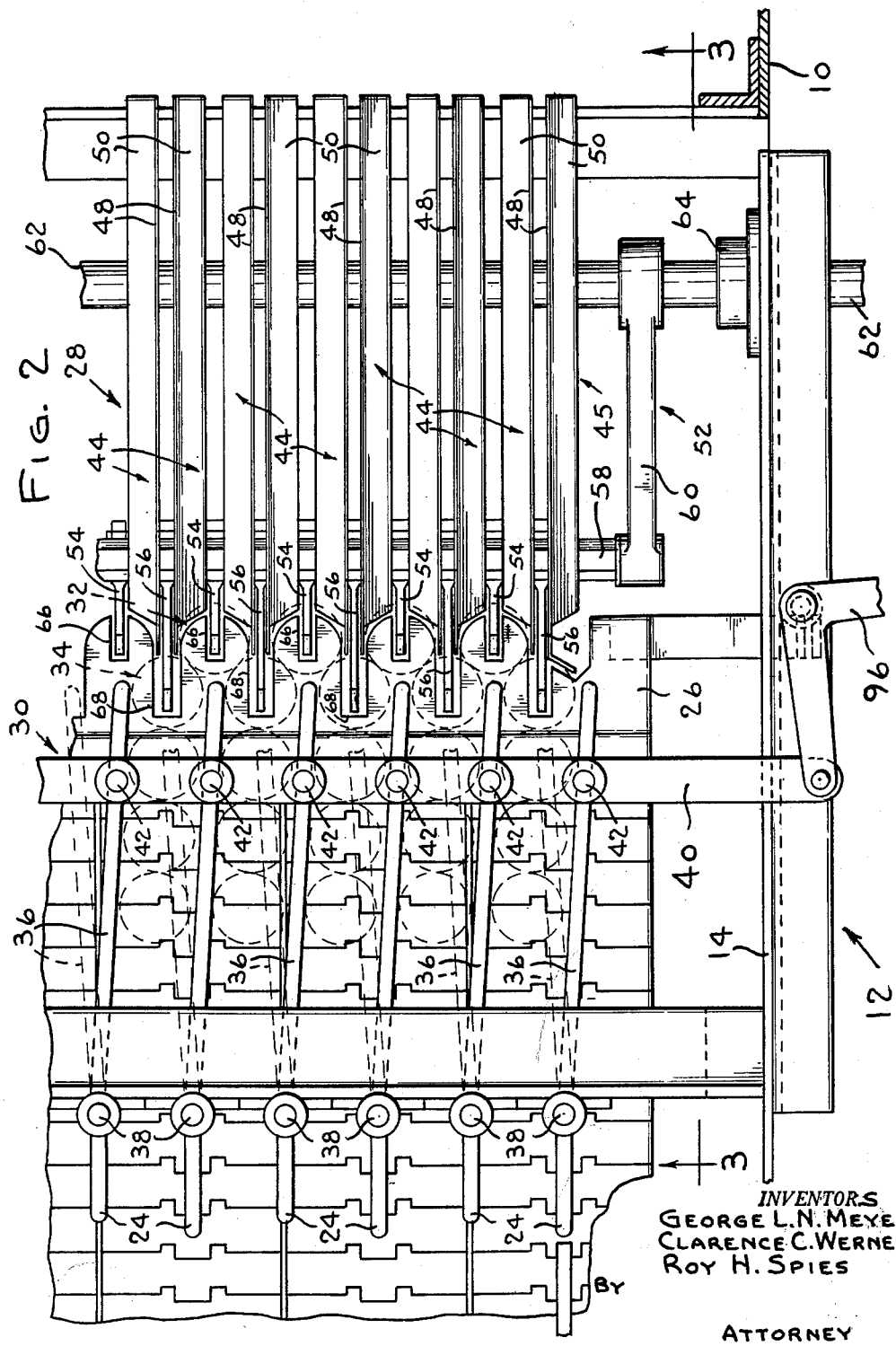

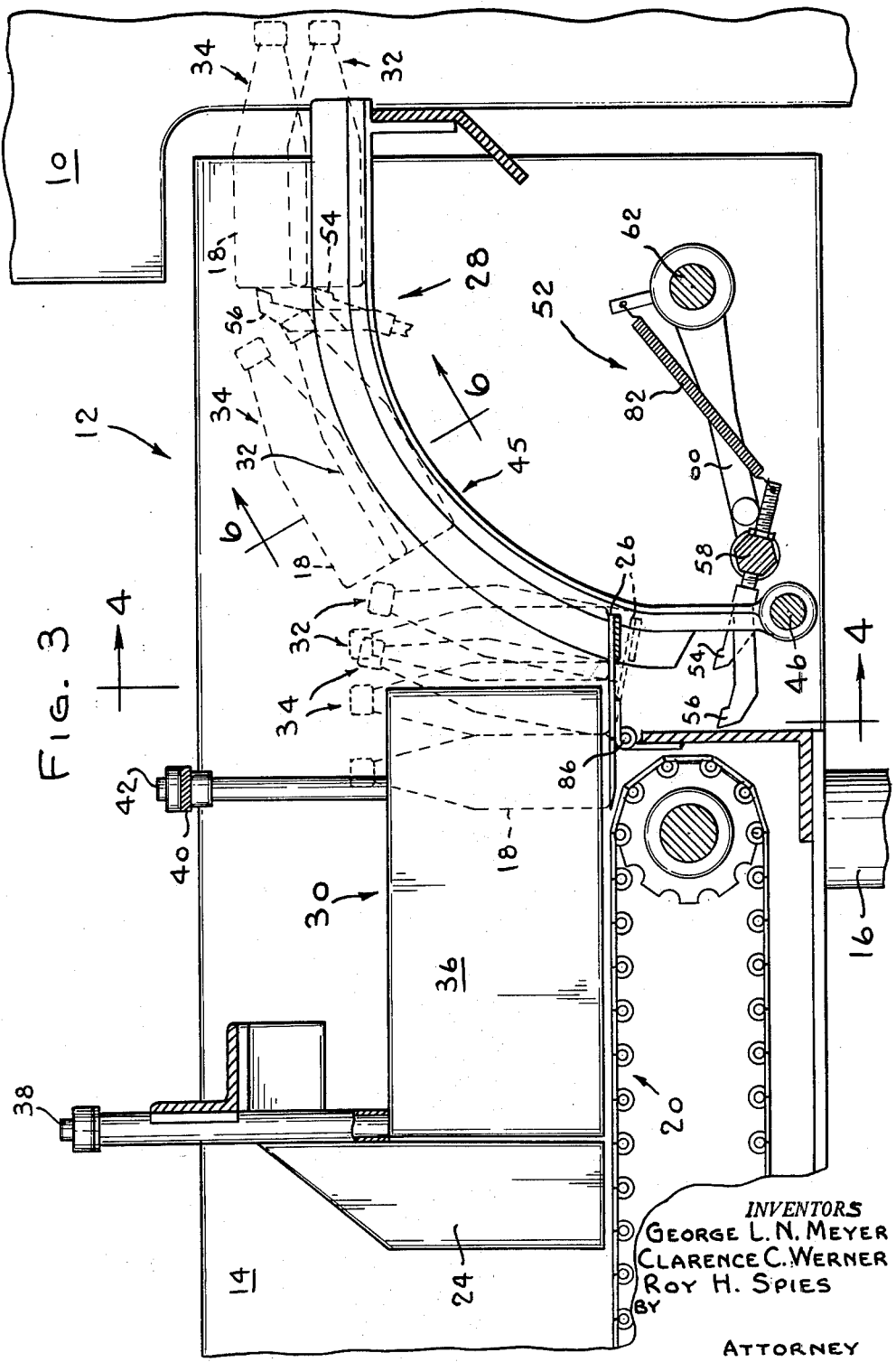

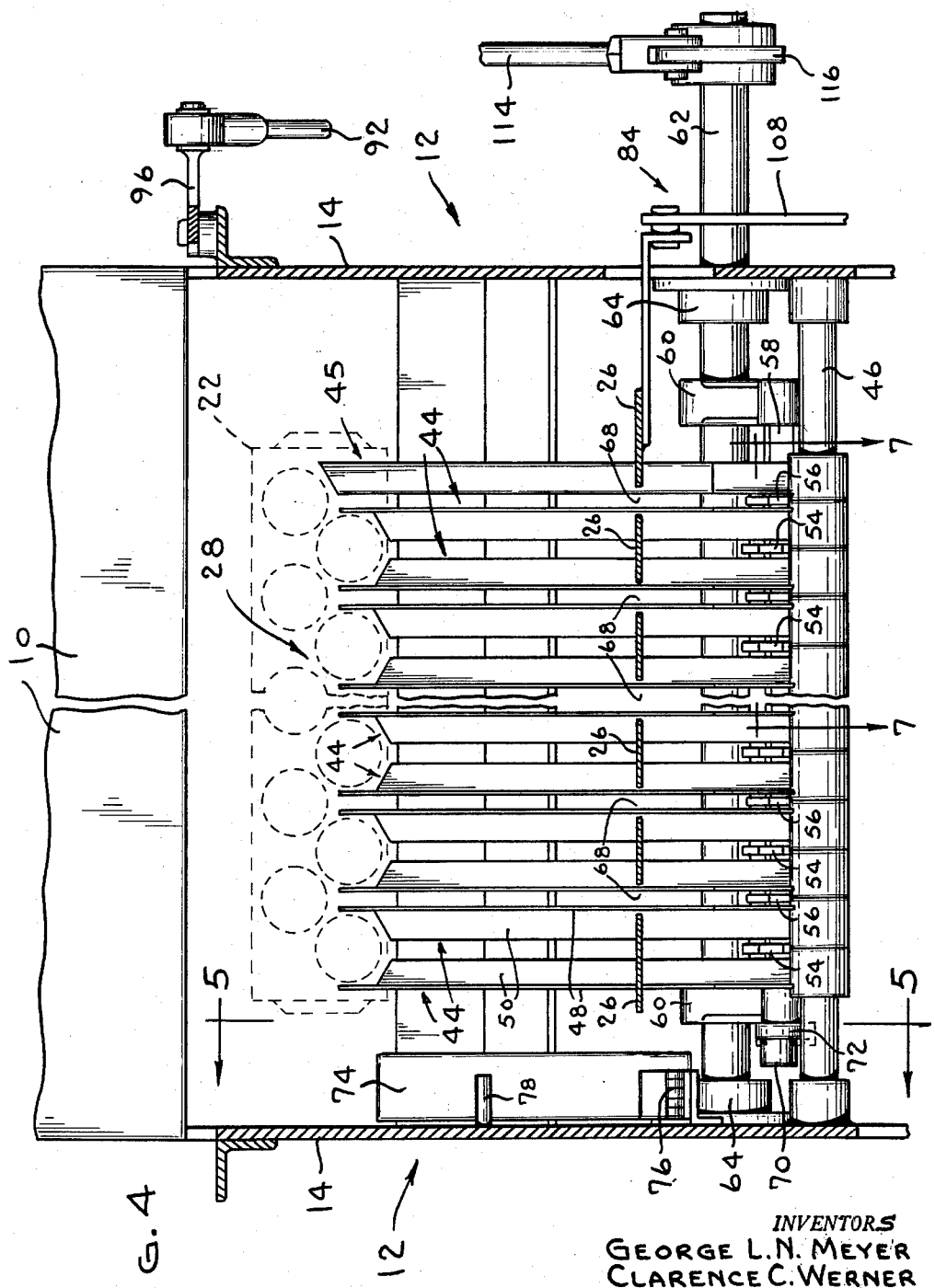

3,081,859
BOTTLE LOADING APPARATUS
George L. N. Meyer, Milwaukee, Clarence C. Werner, Cudahy, and Roy H. Spies, Milwaukee, Wis., assignors to Geo. J. Meyer Manufacturing Co., Cudahy, Wis., a corporation of Wisconsin
Filed May 18, 1961, Ser. No. 111,008
12 Claims. (Cl. 198—27)

This invention relates to apparatus for loading bottles onto a bottle washer.

The primary object of this invention is to provide bottle loading apparatus for a bottle washer which (together with other novel apparatus referred to hereinafter) results in a machine having a substantially greater capacity than prior machines of comparable physical size, cost and speed of operation.

For example, with a bottle washer having a 40-bottle per row carrier, a conventional loader (capable of loading one row at a time) when operated at 15 cycles per minute will handle 15×40 or 600 bottles per minute. By the use of a novel carrier construction (covered in copending applications Serial Nos. 113,852 and 117,656, filed May 31, 1961, and June 16, 1961, respectively) together with a novel bottle unloading apparatus (covered in copending application Serial No. 111,010, filed May 18, 1961) and the loading apparatus of this invention it is possible to load (and unload) two rows of bottles simultaneously. Thus, even if the speed is reduced from 15 to 12½ cycles per minute, for example, the machine will handle 12½×40×2 or 1000 bottles per minute. The result is greater capacity at reduced speed. The reduction of speed is important in that it provides a smoother operation with less likelihood of jamming, breakage, tipping, and less wear on the parts.

The bottle loading apparatus of this invention is adapted for loading two rows of bottles simultaneously from a bottle conveyor into the bottle carrier of a bottle washer. The loading apparatus comprises a staggering means for staggering alternate rows of bottles as they are fed into the loading apparatus, a guide means for receiving the two staggered rows of bottles and guiding the two rows simultaneously into the carrier, and a transfer means for transferring the two rows of bottles simultaneously along the guide means into the bottle carrier. The guide means is adapted to support one row of bottles directly and a second row of bottles in piggy back fashion on the first row as the two rows are transferred by the transfer means from the bottle conveyor to the carrier of the bottle washer.

To insure that the two rows of bottles will not tip backwards as they are lifted from the bottle conveyor onto the guide means, a tilting mechanism is provided to tilt the bottles forwardly toward the carrier just prior to engagement thereof by the bottle transfer means. Such tilting means includes a pivotally mounted dead plate and a means for pivoting the plate at the proper time.

The staggering means for staggering alternate rows of bottles as they are fed to the loader includes a plurality of pivoted gate members and a means for shifting such members as a unit as the bottles pass therebetween on the bottle conveyor. The transfer means for transferring the two rows of bottles simultaneously from the conveyor to the carrier includes two groups of reciprocating pusher fingers adapted to engage the bottoms of the two rows of bottles and to transfer them along the guide means into the bottle carrier.

From the foregoing it will be appreciated that with the loading apparatus of this invention it is possible to load two rows of bottles simultaneously into the bottle washer. To our knowledge no prior loading apparatus is capable of performing this operation. By loading two rows simultaneously it is possible to substantially increase the number of bottles which the loader can handle without increasing the speed at which the loader is operated.

Other objects and advantages will be pointed out in, or be apparent from the specification and claims, as will obvious modifications of the single embodiment shown in the drawings, in which:

FIG. 1 is a side elevation view of the bottle loading apparatus of this invention;

FIG. 2 is a fragmentary top plan view of the loading apparatus shown in FIG. 1;

FIG. 3 is a sectional view taken along line 3—3 of FIG. 2;

FIG. 4 is a sectional view taken along line 4—4 of FIG. 3;

FIG. 5 is a sectional view taken along line 5—5 of FIG. 4;

FIG. 6 is a fragmentary sectional view taken along line 6—6 of FIG. 3; and

FIG. 7 is a fragmentary sectional view taken along line 7—7 of FIG. 4.

Referring to the drawings, FIG. 1 shows the loading end of a bottle washing machine 10 equipped with a loading apparatus 12 of this invention. Apparatus 12 is mounted between side plates 14, 14 and is supported by legs 16. Bottles 18 are carried to loader 12 by an endless chain conveyor 20 (FIGS. 2 and 3). As stated previously, the principal unique feature of the loading apparatus of this invention is its ability to load two rows of bottles simultaneously into the bottle carrier 22 (shown partially in dotted lines in FIG. 4) of the washer 10. Also as stated previously, carrier 22 is of special design and its novel features are described in detail in separate patent applications Serial Nos. 113,852 and 117,656.

The randomly spaced bottles on chain 20 are first separated into parallel columns by alignment plates 24 which are spaced transversely across chain 20 to permit only one bottle at a time to pass therebetween.

The spaced columns of moving bottles are then fed onto a dead plate 26 adjacent a bottle guide means indicated generally by reference numeral 28 by a bottle staggering means indicated generally by reference numeral 30. As shown in FIG. 2, staggering means 30 is adapted to stagger alternate transverse rows 32 and 34 of bottles 18 and includes a plurality of spaced gate members 36 pivotally mounted on vertical posts 38 for parallel shifting movement between the full line and dotted line positions shown in FIG. 2. Gate members 36 of the staggering means are shifted as a unit by means of an actuator bar 40 pivotally connected to gates 36 by means of pins 42. Bar 40 is reciprocated in the proper sequence by a cam and link arrangement shown in FIG. 1 and described in detail hereinafter.

Bottle guide means 28 includes a plurality of spaced pairs of bottle slide elements 44 (FIG. 6) pivotally mounted on a shaft 46 supported between side plates 14, 14. Each element 44 comprises a sloping support strip 48 and a vertical side wall 50. As clearly shown in FIG. 6, the sloping support strips 48 of each pair of slide elements 44 are positioned to provide troughs for supporting a bottle therebetween. An extra slide element 45 is provided at the right hand end of the guide means (as viewed in FIGS. 4 and 6) to partially support the bottle at the extreme right hand end of the upper row 34. Thus, as shown in FIG. 6, the first transverse row 32 of bottles is supported directly on elements 44 while the second row 34 is staggered with respect to the first and is supported in piggy back fashion on the first row of bottles.

The two staggered rows 32 and 34 of bottles are transferred simultaneously one row on top of the next in piggy back fashion from dead plate 26 along guide means 28 to carrier 22 by a bottle transfer means indicated generally by reference numeral 52 (FIG. 3). Transfer means 52 includes a plurality of pusher fingers 54 and 56 adapted for engagement with the bottoms of bottles 18 of rows 32 and 34, respectively. Fingers 54 and 56 are mounted on a shaft 58 for pivotal movement with respect to a pair of crank arms 60 which are reciprocated by means of a bottle pusher drive shaft 62 journaled in bearings 64 mounted in side plates 14, 14. As clearly shown in FIG. 5, the fingers 56 for pushing the second or upper piggy back row 34 of bottles are necessarily longer than the fingers 54 for pushing the first or lower row 32 of bottles. As crank arms 60 are reciprocated by shaft 62, fingers 54 and 56 will move up through slots 66 and 68 in dead plate 26, respectively (FIG. 2), for engagement with the bottoms of the bottles in both rows 32 and 34 to thereby transfer such rows simultaneously from the dead plate into the bottle carrier 22.

The mechanism for pivoting fingers 54 and 56 with respect to crank arms 60 to prevent interference between the fingers and the bottles on plate 26 on the return stroke of the cranks is shown in FIGS. 7 and 4. Such mechanism includes a cam follower 70 mounted on a crank 72 fixed to the end of shaft 58. Follower 70 will ride on the top of a pivoted cam member 74 on the upstroke and on the bottom of the cam member on the return stroke. Cam member 74 is pivotally mounted as at 76 and is biased upwardly against a stop 78 by a spring 80. As shown in FIG. 3, shaft 58 is biased to a finger extended position by a spring 82 so that on the up-stroke cam follower will ride on the top of cam member 74 causing it to pivot downwardly to allow the follower to slide off the end of the cam. On the return stroke the follower will ride underneath the cam causing it to pivot shaft 58 (and fingers 54, 56) so that the fingers will clear the bottles on the dead plate waiting to be transferred to the carrier on the next up-stroke.

To insure that the two rows 32, 34 of bottles 18 will not tip backwards as they are lifted from plate 26 onto guide means 28, a tilting means 84 is provided to tilt the bottles forwardly towards the carrier just prior to the engagement thereof by pusher fingers 45, 56. Such tilting means includes a pivotal mounting 86 for dead plate 26 and a means for pivoting the plate at the proper time.

The apparatus for pivoting dead plate 26, actuating the staggering means 30 and reciprocating the transfer means 52 must all be synchronized with each other and with the movement of carrier 22. While various arrangements could be used, one relatively simple and effective arrangement is shown in FIG. 1 wherein all three operations are controlled by a single cam member 88 mounted on a shaft 90 which is geared to the movement of carrier 22.

Staggering means 30 is actuated as a unit by means of a rod 92 operatively connected to cam 88 by a bell crank 94 and to actuating bar 40 by a bell crank 96 mounted on the side wall 14 of the loader mechanism. Bell crank 94 is provided with a cam follower 98 adapted to ride in a cam 100 cut on the inner face of cam member 88 to thereby impart the proper motion to rod 92 which in turn will reciprocate actuating bar 40 back and forth to pivot gate member 36 from one position to the other.

The dead plate 26 is pivoted to tilt the bottles by means of a rod 102 operatively connected to cam 88 by a crank 104 and operatively connected to plate 26 by a bell crank 106 and a link 108. A cam follower 110 on crank 104 rides in contact with a cam surface 112 on the periphery of cam 88 to impart the proper titling motion to plate 26 as the cam is rotated.

The botle transfer fingers are reciprocated by means of a rod 114 picotally connected to the outer face of cam 88 and operatively connected to drive shaft 62 by a short crank arm 116. Thus, as cam 88 rotates shaft 62 will be pivoted back and forth to transfer two rows of bottles from plate 26 to carrier 22 for each revolution of the cam.

*Operation*

As bottles 18 are carried into loader mechanism 12 on chain 20 they are first separated into a number of parallel columns by alignment plates. The columns are then guided onto dead plate 26 by gate members 36 which direct the first row 32 of bottles into the position shown in FIG. 2. The gates 36 are then shifted by bar 40 so that the second row 34 of bottles will nest in between the first row as shown in FIG. 2. The two rows 32 and 34 have now assumed a staggered position ready for transfer to carrier 22.

With the bottles so positioned, dead plate 26 is pivoted downwardly to tilt the botles forward and immediately thereafter the bottles are engaged by pusher fingers 54, 56 which slide the bottles up and forward along slide elements 44 into carrier 22. As previously explained, during such transfer the first or lower row 32 of bottles is supported directly on elements 44 while the second or upper row 34 is supported by the lower row in piggy back fashion with the bottles of the second row nested between the bottles of the first row as shown in FIG. 6.

From the foregoing it will be appreciated that by transferring two rows of bottles simultaneously from plate 26 to carrier 22 it is possible to greatly increase the number of bottles that can be loaded without increasing the operating speed of the machine or the physical size of the machine.

Although but one embodiment of the present invention has been illustrated and described, it will be apparent to those skilled in the art that various changes and modifications may be made therein without departing from the spirit of the invention or from the scope of the appended claims.

We claim:

1. A bottle loading apparatus for loading bottles from a bottle conveyor into the bottle carrier of a bottle washer comprising, a plurality of reciprocating members adapted for loading two rows of bottles simultaneously into the bottle carrier, and a plurality of guide members adapted to support one row of bottles directly and a second row of bottles in piggy back fashion on one row as the two rows are loaded simultaneously into the carrier.

2. Bottle loading apparatus for loading bottles from a bottle conveyor into the bottle carrier of a bottle washer comprising, a plurality of reciprocating members adapted for loading two rows of bottles simultaneously into the bottle carrier, a plurality of guide members adapted to support one row of bottles directly and a second row of bottles in piggy back fashion on the one row as the two rows are loaded simultaneously into the carrier, and a plurality of bottle staggering members adapted to stagger alternate rows of bottles as they are fed to the bottle washer by the bottle conveyor.

3. Bottle loading apparatus for loading bottles from a bottle conveyor into the bottle carrier of a bottle washer comprising, a plurality of reciprocating members adapted for loading two rows of bottles simultaneously into the bottle carrier, a plurality of guide members adapted to support one row of bottles directly and a second row of bottles in piggy back fashion on the one row as the two rows are loaded simultaneously into the carrier, a plurality of staggering members adapted to stagger alternate rows of bottles as they are fed to the bottle washer by the bottle conveyor, and a tilting member pivotally mounted adjacent said guide means and adapted for pivotal movement to thereby tilt the two staggered rows of bottles just prior to the loading of the two rows of bottles by said plurality of reciprocating members.

4. Bottle loading apparatus for loading bottles from a bottle conveyor into the bottle carrier of a bottle washer comprising, staggering means for staggering alternate rows of bottles as they are fed into the loading apparatus by the bottle conveyor, guide means for receiving the two staggered rows of bottles and guiding the two rows simultaneously into the bottle carrier, and transfer means for transferring the two rows of bottles simultaneously along said guide means into the bottle carrier.

5. Bottle loading apparatus according to claim 4 in which said staggering means includes a plurality of gate members adapted to be shifted as a unit as the bottles pass therebetween on the bottle conveyor.

6. Bottle loading apparatus according to claim 4 in which said guide means includes a plurality of bottle slide elements adapted to support two rows of bottles thereon with one row of bottles staggered with respect to the other row and with one row supported in piggy back fashion on top of the other row.

7. Bottle loading apparatus according to claim 4 in which the transfer means includes two groups of reciprocating pusher fingers, the fingers of one group adapted to engage the bottoms of one row of bottles and the fingers of the other group adapted to engage the bottoms of the other row of bottles.

8. Bottle handling apparatus for loading bottles from a bottle conveyor into the bottle carrier of a bottle washer comprising, staggering means for staggering alternate rows of bottles as they are fed into the loading apparatus, guide means for receiving the two staggered rows of bottles and guiding the rows simultaneously into the bottle carrier, transfer means for transferring the two rows of bottles simultaneously along said guide means into the bottle carrier, and tilting means for tilting the two staggered rows of bottles toward the washer just prior to transfer of the two rows along said guide means by said transfer means.

9. Bottle handling apparatus according to claim 8 in which said tilting means includes a horizontal plate pivotally mounted adjacent said guide means onto which the two staggered rows of bottles are fed by the bottle conveyor, said plate adapted to be pivoted downwardly to tilt the two staggered rows of bottles towards the washer.

10. Bottle loading apparatus for loading bottles from a bottle conveyor into the bottle carrier of a bottle washer comprising, staggering means for staggering alternate rows of bottles as they are fed into the loading apparatus by the bottle conveyor, said staggering means including a plurality of gate members adapted to be shifted as a unit as bottles pass therebetween on the bottle conveyor, guide means for receiving the two staggered rows of bottles and guiding the two rows of bottles simultaneously into the bottle carrier, said guide means including a plurality of bottle slide elements adapted to support two rows of bottles thereon with one row of bottles staggered with respect to the other row and with one row supported in piggy back fashion on top of the other row, and transfer means for transferring two rows of bottles simultaneously along said guide means into the bottle carrier, said transfer means including two groups of reciprocating pusher fingers, the fingers of one group adapted to engage the bottoms of one row of bottles and the fingers of the other group adapted to engage the bottoms of the other row of bottles.

11. A bottle loading apparatus for loading bottles from a bottle conveyor into the bottle carrier of a bottle washer comprising, a plurality of reciprocating members adapted for loading two rows of bottles simultaneously into the bottle carrier, said reciprocating members adapted to support said two rows of bottles with one of the rows of bottles being staggered with respect to the other row and with the rows arranged one above the other with the top row supported in piggy-back fashion on the bottom row.

12. A bottle loading apparatus according to claim 11 in which said reciprocating members are comprised of a plurality of pusher fingers alternately arranged for engagement with the bottoms of the two rows of bottles.

References Cited in the file of this patent
UNITED STATES PATENTS

| | | |
|---|---|---|
| 2,583,787 | McCabe | Jan. 29, 1952 |
| 2,941,650 | McClinton | June 21, 1960 |